(12) United States Patent  
Lyren

(10) Patent No.: US 11,790,096 B2  
(45) Date of Patent: Oct. 17, 2023

(54) TOKENIZING DIGITAL ASSETS WITH RESTRICTIONS ON A BLOCKCHAIN

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 249 days.

(21) Appl. No.: 17/227,420

(22) Filed: Apr. 12, 2021

(65) Prior Publication Data

US 2022/0327225 A1    Oct. 13, 2022

(51) Int. Cl.

| H04L 29/06 | (2006.01) |
|---|---|
| G06F 21/62 | (2013.01) |
| H04L 9/06 | (2006.01) |
| G06Q 20/36 | (2012.01) |
| G10L 19/018 | (2013.01) |
| H04S 1/00 | (2006.01) |
| G06Q 20/06 | (2012.01) |
| H04L 9/00 | (2022.01) |

(52) U.S. Cl.
CPC ..... *G06F 21/6209* (2013.01); *G06Q 20/0658* (2013.01); *G06Q 20/3678* (2013.01); *G10L 19/018* (2013.01); *H04L 9/0643* (2013.01); *H04S 1/007* (2013.01); *H04L 9/50* (2022.05); *H04S 2420/01* (2013.01)

(58) Field of Classification Search
CPC .... G06F 21/6209; G06F 21/12; G06F 21/121; G06F 21/128; G06F 21/62; G06F 21/6218; G06F 21/6245; G06F 21/54; G06F 21/6272; G06Q 20/0658; G06Q 20/3678; G10L 19/018; H04L 9/0643; H04L 9/50; H04L 63/10; H04L 63/101; H04L 63/102; H04L 63/104; H04L 63/105; H04L 63/107; H04S 1/007; H04S 2420/01

See application file for complete search history.

(56) References Cited

U.S. PATENT DOCUMENTS

| 2004/0128324 A1* | 7/2004 | Sheynman | G06F 21/10 |
|---|---|---|---|
| 2007/0294180 A1* | 12/2007 | Bucher | H04N 21/2541 705/59 |
| 2011/0219229 A1* | 9/2011 | Cholas | H04L 63/08 713/168 |
| 2019/0281030 A1* | 9/2019 | Isaacson | H04L 63/0838 |
| 2020/0005284 A1* | 1/2020 | Vijayan | H04L 63/08 |
| 2020/0387341 A1* | 12/2020 | Robinson | G06F 21/6245 |
| 2021/0099405 A1* | 4/2021 | Al Majid | H04L 51/10 |

\* cited by examiner

*Primary Examiner* — Malcolm Cribbs

(57) ABSTRACT

An electronic device receives, from a user, a restriction that restricts how sound of a digital asset plays to non-owners of the digital asset that is tokenized as a non-fungible token (NFT). One or more electronic devices tokenize the digital asset as the NFT on a blockchain that stores the restriction how the sound of the digital asset plays to the non-owners of the NFT.

18 Claims, 11 Drawing Sheets

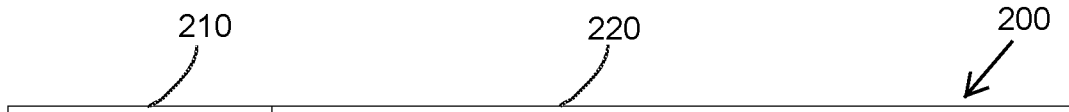

| Type of Digital Asset and/or Token | Restriction on Non-Owner of the Digital Asset and/or Token |
|---|---|
| Music and/or Sound | Play only a portion of the music/sound |
| | Play a low-quality version of the music/sound |
| | Play music/sound a limited number of times |
| | Play music/sound for a limited amount of time |
| | Play music/sound as mono or stereo sound with no spatial audio |
| | |
| Video | Play only a portion of the video |
| | Play a low-quality version of the video |
| | Play video a limited number of times |
| | Play video for a limited amount of time |
| | Play video with no music or no sound |
| | Restrict or prohibiting playing video in AR, VR, MR, and/or XR |
| | |
| Digital Image | Display only portion of digital image |
| | Display a low-resolution version of the digital image |
| | Display digital image for a limited amount of time |
| | Display digital image a limited number of times |
| | Play digital image with no sound or limited sound |
| | Restrict or prohibit viewing of digital image in AR, VR, MR, and/or XR |

Figure 2

| Owner Info 1020 | SLI (HRTFs) 1030 | Restrictions 1040 | Code to spatialize 1050 | Code to tokenize 1060 |

1000

US 11,790,096 B2

TOKENIZING DIGITAL ASSETS WITH RESTRICTIONS ON A BLOCKCHAIN

BACKGROUND

Tokens and cryptography provide important ways to protect digital assets. Various technical challenges, however, have arisen with regard to how this technology protects digital assets and how available this technology is to lay people.

Example embodiments offer solutions to some of these challenges and assist in providing technological advancements in methods and apparatus using tokens and cryptography.

BRIEF DESCRIPTION OF THE DRAWINGS

FIG. 2 is a table that provides examples of restrictions for different types of digital assets that are tokenized on a blockchain with one or more restrictions in accordance with an example embodiment.

SUMMARY

Figure 1:
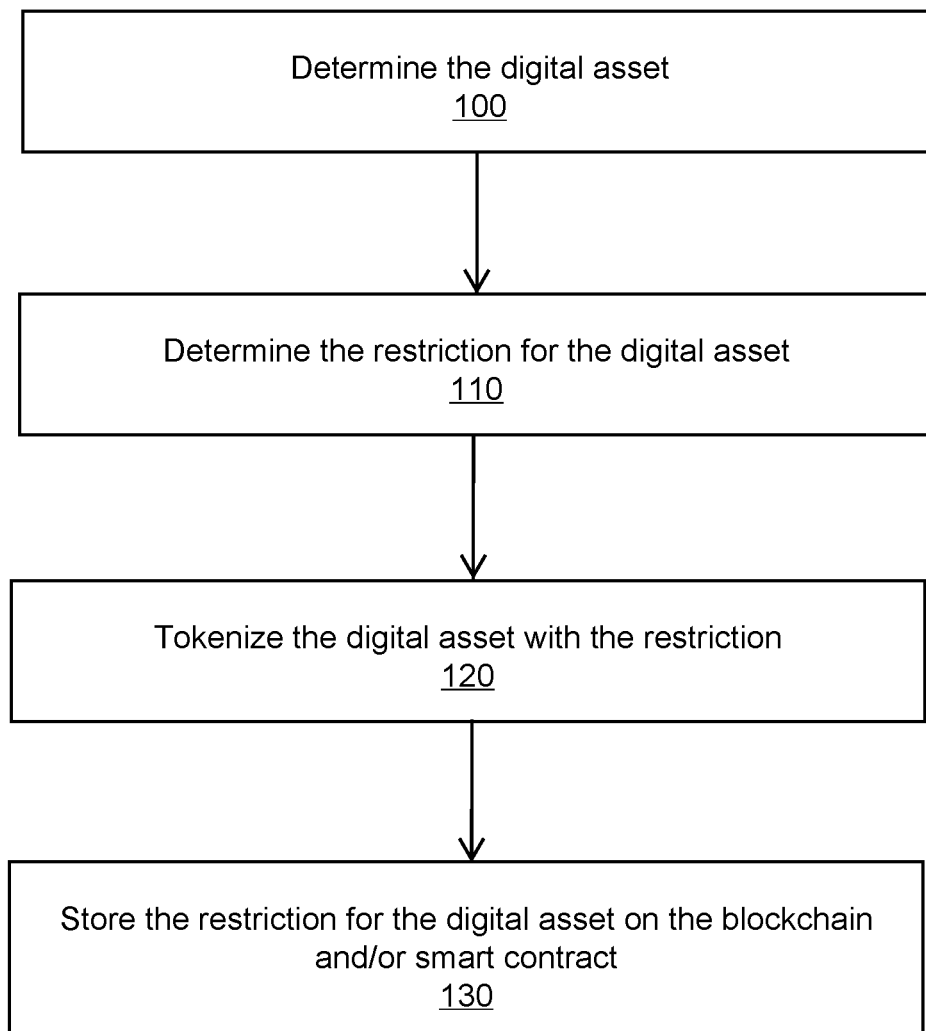
FIG. 1 is a method to tokenize a digital asset with one or more restrictions in accordance with an example embodiment.

Example embodiments include methods and apparatus that tokenize digital assets with one or more restrictions. The restrictions are stored on the blockchain and restrict how sound and/or video plays to non-owners of the token and/or how images appear or are displayed to non-owners of the token.

Example embodiments also include methods and apparatus that expedite spatializing digital assets for users, tokenizing digital assets for users, and distributing the digital assets for sale at an electronic marketplace.

Other example embodiments are discussed herein.

DETAILED DESCRIPTION

If left unprotected, digital assets can be fraudulently or illegally reproduced. For example, once an asset such as a picture, text, a video, film/movie, song, game, software application, broadcast or streaming event, music, artwork, or a voice recording is in digital format, the asset can be copied and then traded or sold without consent of the owner.

Digital assets can be protected if they are tokenized on a blockchain. One problem, however, is that a creator of a digital asset cannot easily tokenize it and create or mint tokens to a blockchain from the digital asset. Tokenizing a digital asset is technically challenging and involves many steps that require knowledge of cryptocurrencies, blockchains, wallets, and tokens. An average person or layperson does not have this knowledge and skill.

Consider an example in which an average person creates a digital asset, such as making a voice recording, taking a picture, recording music, capturing a video, sending a written message (e.g., a Tweet or text), etc. Although the person can create this digital asset, he or she cannot readily create a token or cryptocurrency for this digital asset since creating such a crypto token or cryptocurrency requires knowledge and expertise in this technical field.

An example embodiment solves this problem and enables an average person or layperson to readily create a token on a blockchain from a digital asset without having an expertise or extensive knowledge in cryptocurrencies, blockchains, wallets, tokens, and other facets of this technical field. The person is not required to be a programmer or experienced in creating tokens or cryptocurrencies. Instead, an example embodiment provides a simplified graphical user interface (GUI) or UI that enables a layperson to readily create, store, sell, trade, and market tokens and thus provides an avenue to help people easily secure, market, and monetize their digital assets.

Another problem is that each person with access to a token has equal rights to view or use the token regardless of whether the person is an owner of the token. Consider an example in which an artist creates a picture, tokenizes the picture, and offers the picture for sale as a token, such as a non-fungible token (NFT). Other people can access the token and view the picture without making a payment to the owner of the token. Granted, these other people are not owners of the token and would not appear on the blockchain, but nonetheless they can view and enjoy the picture for free.

An example embodiment solves this problem by restricting or limiting access to one or more rights, privileges, and/or properties of the token. An owner of the token has full access to all rights, privileges, and/or properties of the token, but non-owners of the token have a limited access. This prevents people from enjoying all attributes of the token unless they become an owner of the token.

Consider an example in which a studio tokenizes a movie or film into thousands of tokens and offers these tokens for sale. Purchasers or owners of these token can view the film in its entirety, but non-owners of the token can only view a portion of the film, trailers of the film, or none of the film.

Another problem is that a creator of a digital asset cannot easily spatialize the digital asset. Spatializing a digital asset is technically challenging and involves many steps that require knowledge of one or more of spatial audio, 3D animation, AR, and VR. An average person or layperson does not have this knowledge and skill.

An example embodiment solves this problem by spatializing a digital asset for the user. The user issues a command to an electronic device to spatialize the digital asset, and the electronic device automatically spatializes the digital asset in response to the command. The user is not required to have extensive knowledge or technical knowledge about spatialization in order to spatialize a digital asset.

As another problem, each person has unique physical characteristics that enable the person to localize binaural sound to its point of origin. If sound for the digital asset is not processed with the correct sound localization information (SLI), then the listener will be unable to localize the source of the sound to the correct location.

An example embodiment solves this problem by storing sound localization information in the blockchain and/or one or more smart contracts. For example, this information includes head-related transfer functions (HRTFs) for processing the sound. These HRTFs can be generic or individualized or particular to the listener, such as correlated to one or more physical attributes of the listener.

Example embodiments discuss solutions to these and other problems in more detail below.

FIG. 1 is a method to tokenize a digital asset with one or more restrictions in accordance with an example embodiment.

Block 100 states determine the digital asset.

A user, an electronic device, hardware, and/or software identifies, creates, uploads, downloads, retrieves, captures, selects, or provides the digital asset. For example, a person uses one or more electronic devices to create, to capture, or to record a photograph, an image, a voice, a video, music, or other type of digital asset. For example, a software program (e.g., a user agent) selects the digital asset based on previous or historical selections by a user. For example, one or more sensors or cameras in an electronic device capture an activity and/or location of a user, and a software program selects the digital asset based on the activity and/or location of the user. As another example, a wearable electronic device worn on a head of a user displays, creates, and/or captures an augmented reality (AR) image or AR video, a virtual reality (VR) image or VR video, a hologram, or other virtual image. As another example, an artificial intelligence (AI) program creates original art in a digital format. As another example, an electronic device scans, captures, and/or records written text, such as a Tweet, Short Message Service (SMS), Multimedia Message Service (MMS), news or sports article, quote, headline, etc. As another example, one or more cameras in wearable electronic glasses (e.g., AR glasses) capture an image and/or record audio. As another example, a person creates two-dimensional (2D) artwork on a tablet computer or creates three-dimensional (3D) artwork or models in AR or VR. As yet another example, a person takes a selfie or self-portrait and/or records a short video (e.g., sixty seconds or less). As yet another example, a studio or company creates a podcast, a radio show, a television show, a YouTube show, a streaming service, a video, a film, a music video, a concert, a performance, or a broadcast. As yet another example, a sports organization creates, records, or releases video or footage of a sporting event, such as a previous moment in sports, a live event, or a streaming event. As yet another example, a company creates a contract, a software application, or a game, such as an AR or VR game. As yet another example, a user issues a verbal command or a gesture command to an electronic device that captures and/or creates a digital asset in response to this command. As yet another example, an electronic device selects the digital asset in an active window or current view of the user. As another example, the digital asset is a video with sound. Examples of the video or a video with sound include, but are not limited to, video captured with a smartphone, video captured with a WED or a HMD, a moving AR image that plays or executes in a game or application, a moving VR image that plays or executes in a game or application, a hologram that moves, and a virtual image that moves.

Block 110 states determine the restriction for the digital asset.

A user, an electronic device, hardware, and/or software identifies, creates, uploads, downloads, retrieves, captures, selects, or provides the restriction for the digital asset. For example, a graphical user interface (GUI) or user interface (UI) displays one or more restrictions that a user selects. As another example, a software program automatically selects one or more restrictions for the digital asset on behalf of the user.

For example, a software program (e.g., a user agent) selects the restriction based on previous or historical selections by a user. For example, one or more sensors or cameras in an electronic device capture an activity and/or location of a user, and a software program selects the restriction based on the activity and/or location of the user. For example, based on a file type or content in a digital asset, an electronic device selects a restriction for the digital asset. As another example, an artificial intelligent (AI) program selects or recommends the restriction on behalf of the user. As another example, an electronic device selects the restriction based on the hardware used to capture the digital asset (e.g., selecting a video-based restriction when a camera captures the digital asset or selecting an audio-based restriction when one or more microphones capture the digital asset). As another example, an electronic device selects the restriction based on the application used to create the digital asset (e.g., selecting a restriction to pixelate the digital asset that was created in a drawing program). As yet another example, a user issues a verbal command or gesture command to an electronic device that generates the restriction in response to this command (e.g., a verbal command provides a type of restriction). As yet another example, the electronic device selects a default restriction (e.g., select a sound restriction if the digital asset includes sound or select a video restriction if the digital asset has a file extension identifying the asset as being a video).

Block 120 states tokenize the digital asset with the restriction.

Different properties, rights, features, privileges, and/or permissions of the token can be restricted. These restrictions can differ depending on the type of token, the type of asset being protected via the token, and/or preferences of the owner of the token.

Consider an example in which an artist creates a picture. An electronic device and/or software program tokenizes the picture on behalf of the user and offers the picture for sale as a token. An example embodiment restricts access to one or more features of the tokenized picture unless a person buys the token. For example, non-owners of the token cannot view a full or entire image of the picture. As another example, non-owners cannot view a high-resolution image of the picture. After the non-owner purchases or acquires rights to the token, he or she will become an owner and thus have full access privileges to the token. This encourages people to acquire ownership in a token as they cannot fully enjoy or utilize a digital asset without becoming an owner of the asset.

Block 130 states store the restriction for the digital asset on the blockchain and/or smart contract.

An example embodiment stores the one or more restrictions for the digital asset on the blockchain and/or one or more smart contracts for the token created for the digital asset.

In an example embodiment, the restrictions are translated into executable code or programming code of a smart contract that includes conditional statements that describe the restrictions governing future transactions and/or how the digital asset plays or is displayed. The code for the restrictions is stored in the blockchain network and replicated among the participants or nodes in the blockchain across a distributed ledger. When a term of the smart contract (e.g., ownership, restriction, etc.) is verified among the participants, the transaction executes.

For example, entries into the ledger include restrictions as computer code that execute the terms and the conditions of the smart contract. These terms and conditions can be partially or fully self-executing code and/or self-enforcing code, such as code to execute the one or more restrictions associated with the token and digital asset.

FIG. 2 is a table 200 that provides examples of restrictions for different types of digital assets that are tokenized on a blockchain with one or more restrictions in accordance with an example embodiment.

Table 200 includes column 210 (type of digital asset and/or token) and column 220 (restriction on non-owner of the digital asset and/or token). Column 210 includes three types of digital assets and/or tokens: Music and/or Sound, Video, and Digital Image. Column 220 includes example restrictions for the corresponding digital assets and/or tokens.

The restrictions for the music and/or sound include playing only a portion of the music and/or sound, playing a low-quality version of the music and/or sound, playing the music/sound a limited number of times, playing the music and/or sound for a limited amount of time, and playing the music and/or sound as mono or stereo sound with no spatial audio.

The restrictions for the video include playing only a portion of the video, playing a low-quality version of the video, playing the video a limited number of times, playing the video for a limited amount of time, playing the video with no music or no sound, and restricting or prohibiting playing of the video in augmented reality (AR), virtual reality (VR), mixed reality (MR), and/or Extended Reality (XR).

The restrictions for the digital image include displaying only a portion of the digital image, displaying a low-resolution version of the digital image, displaying the digital image for a limited amount of time, displaying the digital image a limited number of times, playing the digital image with no sound or limited sound, and restricting or prohibiting viewing of the digital image in AR, VR, MR, and/or XR.

In an example embodiment, an electronic device displays and/or provides one or more of these restrictions via a user interface to the user. The user interacts with the electronic device and/or user interface to select, to add and/or to delete one or more of these restrictions to the tokenized digital asset.

Consider an example restriction in which an owner can view a tokenized video while non-owners cannot view the video. For example, a person records a short video (e.g., sixty seconds or less) and tokenizes the video per an example embodiment with multiple tokens. The video of the token plays as a meme, animation, or short clip. This person is the owner of video and has unrestricted access to play the video. Other people who purchase a token are also owners and can play the video without restriction. Information about the owner and/or the one or more restrictions are recorded on the blockchain of the token. When the owner attempts to play the video, his or her identity is verified as appearing on the blockchain. Identification (ID) or verification of the owner can include one or more of biometric identification (e.g., fingerprint ID, face ID, voice ID, etc.), username and password, cookies, internet protocol (IP) address or media access control (MAC) address, security key, private key, encryption key, etc. One or more of this information along with the restrictions are stored on the blockchain and used in the identification and/or verification process of the owner. When a non-owner attempts to view the video, his or her identity will not be on the blockchain, and hence the non-owner will be unable to view the video of the token.

Consider an example of a tokenized digital asset (e.g., an NFT) on the blockchain that stores the one or more restrictions. The digital asset is a video that plays sound, and the restriction restricts how non-owners of the NFT hear the sound and/or view the video. As one example, the restriction restricts playing the video with sound to the non-owners of the NFT for a limited amount of time that is less than time to play a full version of the video with sound. For instance, the video plays for a full duration of sixty seconds, but an electronic device only plays a portion of the vide that lasts for a limited time less than the time to play the full version (e.g., play for 10 seconds, 20 seconds, 30 seconds, 40 seconds, or 50 seconds). As another example, the restriction restricts a number of times the non-owners of the NFT are able to view the video with sound (e.g., a display of the electronic device limits viewing the video to one time, two times, three times, four times, or a limited number of times). The blockchain and/or smart contract store these restrictions.

Consider another example restriction in which only members of a certain group have full rights or access to a digital asset or token without a restriction provided by the owner or seller of the token. For example, friends, members, or followers of an owner on a social network or social platform can view the token without restriction, whereas non-friends, non-members, or non-followers cannot view the token. For instance, in order to view a token without a restriction, a person must be a follower or friend of the owner of the token on TIK-TOK, FACEBOOK, WHATSAPP, WECHAT, TELEGRAM, LINE, INSTAGRAM, CLUBHOUSE, etc. Alternatively, a person must use a certain software application, website, or hardware device. For example, in order to play and to view a token, the person must use an OCULUS QUEST headset.

In an example embodiment, the owner or seller of the token can select one or more restrictions to place on the token. For example, the owner is an administrator that can restrict or limit access to the digital asset and/or token. Further, the owner can set one or more restriction levels to non-owners with each restriction level having different restrictions, such as high restriction, moderate restriction, low restriction, and/or unrestricted.

Consider an example embodiment in which one or more of the restrictions discussed herein are set to one or more levels. The owner selects a level of restriction for the token, and this level of restriction imposes one or more restrictions or limits on subsequent non-owners to view, to play, to hear, or to otherwise experience the tokenized digital asset. These restrictions can also be set by the original owner and imposed or enforced on subsequent owners, known as restricted owners. For example, the person that creates and mints the token is the original owner, whereas subsequent buyers of the token are restricted owners.

An example embodiment thus enables an original owner or creator of a token to place one or more restrictions on the token that are imposed on non-owners and/or subsequent owners. The subsequent owners are restricted owners since ownership is subject to one or more restrictions placed on the token by a previous owner, who is the creator or original owner of the token. The creator of the token can thus restrict or control how the token is reproduced, marketed, sold, bought, viewed, heard, enjoyed, etc.

Consider an example in which an original owner (e.g., an actor) makes a voice recording of a short message (e.g., "Yo, waz-up!"). The original owner or actor assigns the voice recording to a graphical representation, such as an emoji, animoji, meme, sticker, hologram, AR image, VR image, text, link, virtual image, etc. The actor then tokenizes the graphical representation and produces ten thousand tokens for distribution and sale. When a person (buyer) subsequently buys and activates the graphical representation of the token, the voice recording of the actor plays to the person. As such, the buyer is able to hear the original voice of the actor. This voice can externally localize to the listener with 3D sound, spatial sound, or binaural sound to a moving AR image or to a moving VR image. When a person (non-buyer) activates the graphical representation of the token, however, the voice recording of the actor plays in mono sound, as opposed to spatial audio. The non-buyer is not able to hear the voice of the actor in spatial audio unless the non-buyer purchases the token.

Consider the example in which an artist creates a video and voice recording that plays for ten seconds and tokenizes the recording as tokens that when activated play as an AR or VR virtual image. The virtual image or tokens are transmittable and playable over a social media or messaging application (e.g., WHATSAPP, FACEBOOK, a multi-player game, or a social media application in AR or VR). When creating the tokens, the artist decides to place one or more restrictions on the tokens to all subsequent owners, who are restricted owners. The restrictions prevent sound of the virtual image from playing when the virtual image is sent or transmitted from a non-owner of the token.

Consider an example in which an artist mints a talking hologram into NFTs and places a restriction on the sound. Specifically, the sound of the talking hologram will not play to non-owners. Bob buys one of the NFTs from the artist and hence becomes a restricted owner since the NFT has a restriction set by the artist who is the creator of the token. Bob is added to the ledger of the blockchain as an owner. The NFT appears as a talking hologram that plays in Bob's messaging or media application. Bob can watch and send the hologram an unlimited number of times since he is a restricted owner and on the record of the blockchain. During an electronic communication, Bob sends the hologram to his friend Alice, who is neither the creator nor a restricted owner of the NFT. When Alice clicks on or otherwise activates the hologram, she sees and hears the talking hologram that plays for ten seconds. Alice loves the hologram, and she decides to send or to forward it to her friend James through a media or messaging application. When James clicks on or otherwise activates the hologram, the hologram moves for ten seconds but no sound plays. James sends Alice a message asking why the hologram had no sound. Alice realizes that in order to send the hologram with the sound, she must purchase one of the NFTs and become a restricted owner listed on the blockchain. Alice purchases one of the NFTs, and then re-sends the hologram to James via the media or messaging application. When James clicks on or activates the hologram, he sees and hears the talking hologram.

In an example embodiment, the restriction forms part of or is included in the blockchain of the digital asset. For example, the restriction is coded into or with the digital asset and/or forms part of the blockchain ledger in one or more layers of the blockchain.

Tokens include ownership details to identify owners for transfer between token holders. The token can also include one or more permission fields or settings that set forth the restrictions associated with the digital asset and token. An owner, seller, or creator of the digital asset and token can establish, set, add, delete, or change permissions that relate to one or more restrictions for the digital asset and token. These permissions and rights to change them are stored in the blockchain and/or smart contract.

FIGS. 3A-3D show an electronic device 300 with a display 310 displaying a user interface 320 that enables an owner of a digital asset or token to establish one or more restrictions for a tokenized digital asset in accordance with an example embodiment.

Figure 3A:
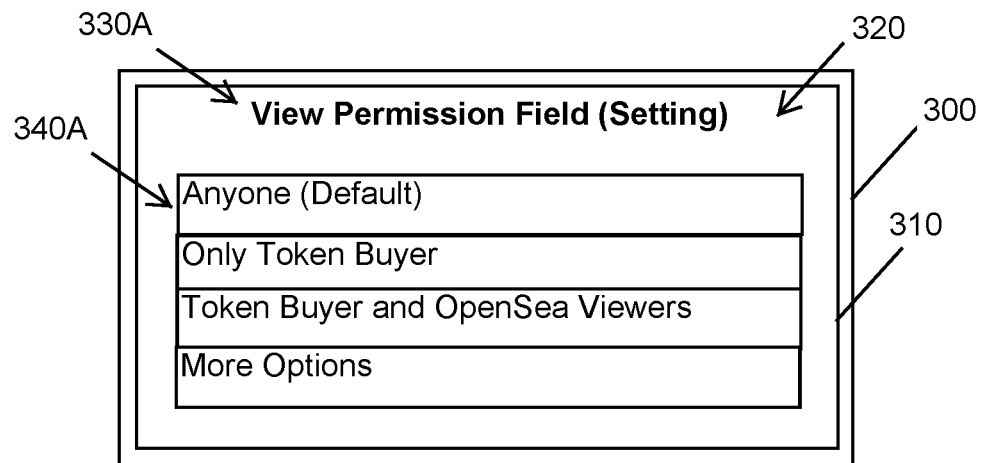
FIGS. 3A-3D show an electronic device with a display displaying a user interface that enables an owner of a digital asset or token to establish one or more restrictions for a tokenized digital asset in accordance with an example embodiment.

As shown in FIG. 3A, the user interface 320 includes a view permission field or setting 330A that enables the user to set one or more permissions with regard to rights of others to view the tokenized digital asset. By way of example, the view permission field 330A includes four permissions 340A: Anyone (Default), Only Token Buyer, Token Buyer and OpenSea Viewers, and More Options. Under Anyone (which is set to default), any person or user can view the tokenized digital asset without a restriction concerning view. When Only Token Buyer is selected, then only a buyer of the tokenized digital asset can view the tokenized digital asset without a restriction concerning view. Other users who are not a buyer of the token will be unable to view the tokenized digital asset without a restriction. When Token Buyer and OpenSea Viewers is selected, then buyers of the token and users at OpenSea can view the tokenized digital asset without a restriction concerning view. Other users will be unable to view the tokenized digital asset without a restriction. Thus, in order to view the token without a restriction, the user would have to either purchase the token or navigate to the OpenSea website and view the token there. When More Options is selected, the user interface 320 displays more restrictions that a user can select for the tokenized digital asset. Examples of these restrictions are in FIG. 2 and discussed herein.

Figure 3B:
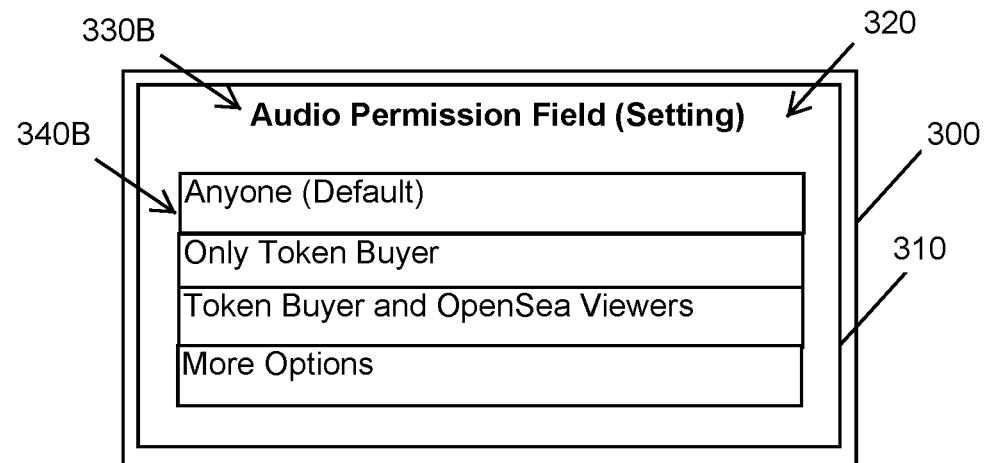

As shown in FIG. 3B, the user interface 320 includes an audio permission field or setting 330B that enables the user to set one or more permissions with regard to rights of others to hear sound of the tokenized digital asset. By way of example, the view permission field 330B includes four permissions 340B: Anyone (Default), Only Token Buyer, Token Buyer and OpenSea Viewers, and More Options. Under Anyone (which is set to default), any person or user can listen to sound of the tokenized digital asset without a restriction concerning sound or audio. When Only Token Buyer is selected, then only a buyer of the tokenized digital asset can listen to sound of the tokenized digital asset without a restriction concerning audio. Other users who are not a buyer of the token will be unable to listen to sound of the tokenized digital asset without a restriction. When Token Buyer and OpenSea Viewers is selected, then buyers of the token and users at OpenSea can listen to sound of the tokenized digital asset without a restriction concerning audio. Other users will be unable to listen to sound of the tokenized digital asset without a restriction. Thus, in order to listen to sound of the token without a restriction, the user would have to either purchase the token or navigate to the OpenSea website and listen to the token there. When More Options is selected, the user interface 320 displays more restrictions that a user can select for the tokenized digital asset. Examples of these restrictions are in FIG. 2 and discussed herein.

Figure 3C:
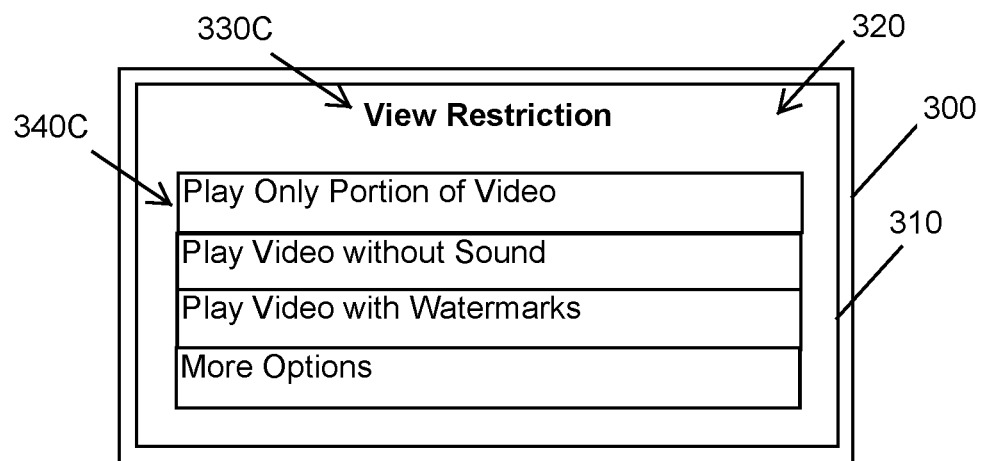

As shown in FIG. 3C, the user interface 320 includes a view restriction 330C that enables the user to set one or more restrictions with regard to rights of others to view the tokenized digital asset. By way of example, the view restriction 330C includes four restrictions 340C: Play Only Portion of Video, Play Video without Sound, Play Video with Watermarks, and More Options. Under Play Only Portion of Video, non-owners are unable to view a full or complete version of the video. Instead, an electronic device plays a portion or incomplete version of the video. Under Play Video without Sound, the video plays but does not include sound. Sound for the video does not play even though the video has sound. Under Play Video with Watermarks, the video plays but one or more watermarks appear on the display. To view the video playing without watermarks, the viewer should purchase the tokenized digital asset. Under More Options, the user interface 320 displays more restrictions that a user can select for the tokenized digital asset. Examples of these restrictions are in FIG. 2 and discussed herein.

Figure 3D:
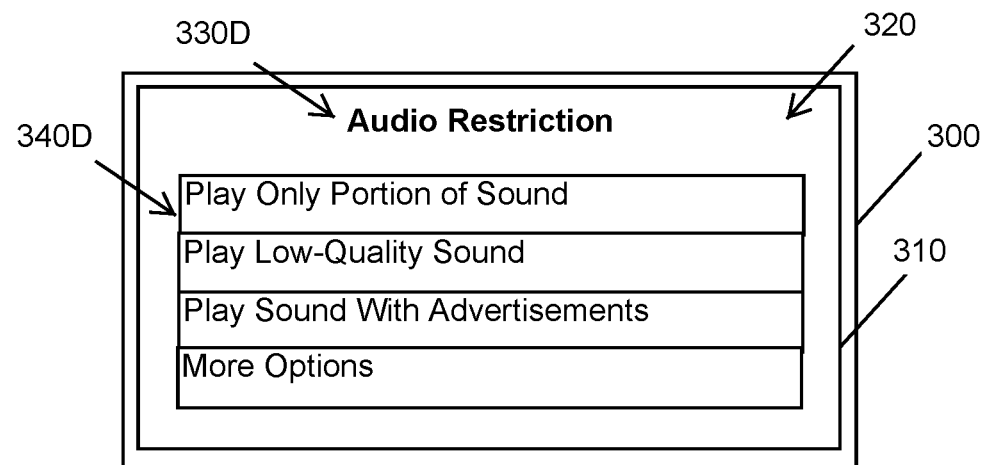

As shown in FIG. 3D, the user interface 320 includes an audio restriction 330D that enables the user to set one or more restrictions with regard to rights of others to hear sound of the tokenized digital asset. By way of example, the audio restriction 330D includes four restrictions 340D: Play Only Portion of Sound, Play Low-Quality Sound, Play Sound with Advertisements, and More Options. Under Play Only Portion of Sound, non-owners are unable to hear or listen to a full or complete version of the sound. Instead, an electronic device plays a portion or incomplete version of the audio. Under Play Low-Quality Sound, the sound plays with a lower quality, such as playing in mono sound instead of stereo sound or spatial audio. Under Play Sound with Advertisements, the sound plays but one or more advertisements interrupt playing of the sound. To play the sound without advertisements, the listener should purchase the tokenized digital asset. Under More Options, the user interface 320 displays more restrictions that a user can select for the tokenized digital asset. Examples of these restrictions are in FIG. 2 and discussed herein.

Consider an example in which the user interface includes a Share field that determines who can view and/or play the digital asset when the digital asset is shared with non-buyers of the token. For example, when a person belongs to one of the identified groups in the Share field, video and/or audio permissions automatically grant to this person whether the person is or is not a buyer of the token.

Consider an example in which an electronic marketplace, such as OpenSea or Rarible, hosts and offers for sale a digital asset as a token, such as an NFT. When people navigate to the website and view the digital asset, they see a restricted version of this digital asset. For example, this restricted version is a pixelated copy or low-resolution copy of the original high-resolution digital asset that will be provided when the token for this digital asset is purchased. As another example, the restricted version shows or plays a portion of the digital asset, such as playing a portion of a video and not the entire video or displaying a portion of an image and not the entire image. As another example, the restricted version does not play sound of the video or plays some, but not all, the sound of the video. As another example, the restricted version is a reduced-size version of the digital art, such as being a thumbnail, preview image, or sketch of the unrestricted version of the digital asset.

Figure 4:
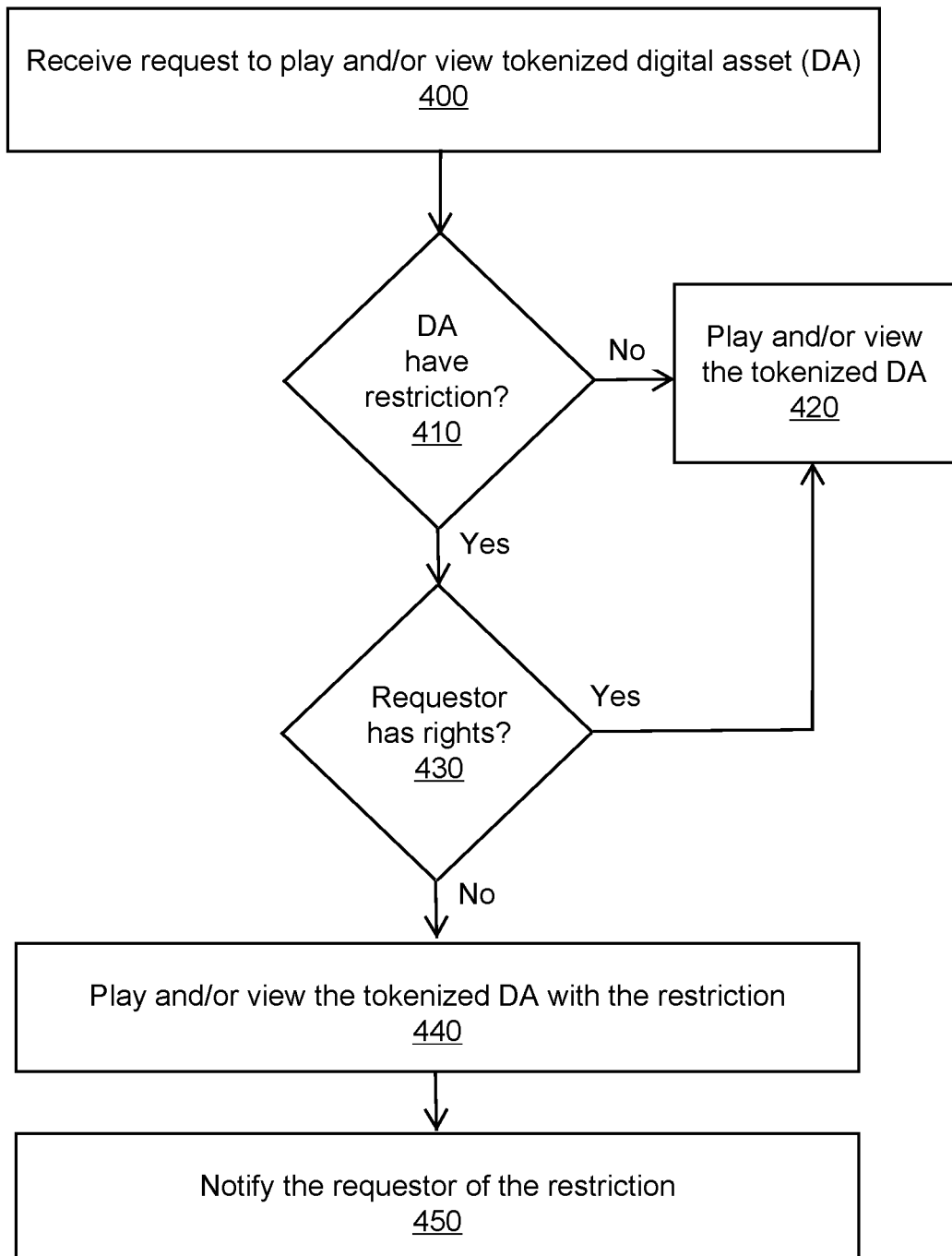
FIG. 4 is a method to play and/or view a tokenized digital asset in accordance with an example embodiment.

FIG. 4 is a method to play and/or view a tokenized digital asset in accordance with an example embodiment.

Block 400 states receive request to play and/or view a tokenized digital asset (DA).

For example, an electronic device receives a request to play or to view a tokenized digital asset. For instance, a user navigates to an electronic marketplace to view a tokenized digital asset. As another example, a user interacts with an electronic device or user interface and requests to play, to view, and/or to hear a tokenized digital asset. As another example, an electronic device, a user agent, or a software application or game makes a request to play, to display, or to transmit the tokenized digital asset.

Block 410 makes a determination as to whether the tokenized digital asset has one or more restrictions.

For example, the restriction is stored with or forms part of the tokenized digital asset, blockchain, and/or smart contract. For instance, the restriction is an executable instruction or code that activates or executes when the request to play and/or view the tokenized digital asset occurs. As another example, the restriction forms part of or is defined in a parameter, field, or setting of the tokenized digital asset. As another example, the restriction was provided from the owner of the token to an electronic marketplace as a condition for the sale of the tokenized digital asset at the website of the electronic marketplace. As another example, an electronic marketplace flags or groups restricted tokenized digital assets together in one group and non-restricted or unrestricted tokenized digital asset in another group.

If the answer to the determination in block 410 is "no" then flow proceeds to block 420 that states play and/or view the tokenized digital asset.

The request to play and/or view the tokenized digital asset grants when no restriction applies. For example, a user clicks on a tokenized digital asset that is a game or video, and the game or video plays to the user without a restriction. As another example, the tokenized digital asset is a 3D AR image that the user can view and navigate around without a restriction. As another example, the tokenized digital asset is a video with spatial audio that plays without a restriction.

If the answer to the determination in block 410 is "yes" then flow proceeds to block 430 that makes a determination as to whether the requestor has rights to play and/or view the tokenized digital asset. If the answer to this determination is "yes" then flow proceeds to block 420. If the answer to this determination is "no" then flow proceeds to block 440 that states play and/or view the tokenized digital asset (DA) with the restriction.

The requestor is able to play and/or view the tokenized digital asset without a restriction if the requestor has rights or permission to do so. For example, the requestor is a creator, an owner, or a seller of the tokenized digital asset. As another example, the requestor is a member of a group that has rights to play and/or view the tokenized digital asset without a restriction. Example embodiments discuss other example restrictions herein.

Block 450 states notify the requestor of the restriction.

An electronic device notifies the requestor of the restriction in various ways, such as displaying the restriction, displaying a notice or warning that the tokenized digital asset is subject to a restriction, playing an audio warning or audio message informing the user of the restriction, playing a video warning informing the user of the restriction, displaying a symbol that alerts the user of the restriction, sounding an alert, displaying words, text, graphics, or other indicia on or near the tokenized digital asset, etc.

Consider an example in which an electronic device receives a tokenized digital asset over a network or retrieves the tokenized digital asset from memory, storage, or a database. The tokenized digital asset includes a setting or flag marking the digital asset as having a restriction. This setting or flag instructs or causes the electronic device to display and/or play the tokenized digital asset with the restriction. The electronic device also displays a notice that informs the user of the restriction.

Figure 5:
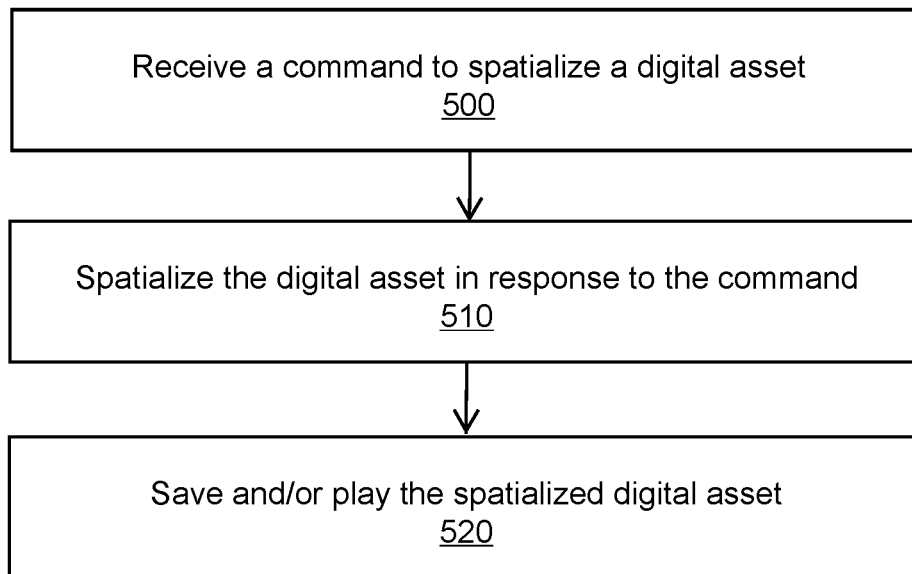
FIG. 5 is a flow diagram of an automated process that spatializes a digital asset in response to a command in accordance with an example embodiment.

FIG. 5 is a flow diagram of an automated process that spatializes a digital asset in response to a command in accordance with an example embodiment.

Block 500 states receive a command to spatialize a digital asset.

An electronic device receives a command to spatialize a digital asset. Examples of the command include, but are not limited to, a spoken or verbal command from the user, a gesture command from the user, a command from a portable electronic device (PED), a command from a handheld portable electronic device (HPED), or a command or instruct from a user interface of the electronic device. For example, the electronic device receives the command from another electronic device, such as from a server, a wearable electronic device with the user, a portable electronic device (such as a smartphone in a hand of the user), a controller in a hand of the user, a smartwatch, or another electronic device.

Consider an example in which a user clicks on or otherwise activates a single button, icon, menu selection, or graphical representation that instructs the electronic device to initiate steps to spatialize a selected digital asset. As another example, the user selects or identifies a digital asset and issues a single voice command (e.g., "spatialize"), and this command instructs one or more electronic devices to execute a sequence of steps to spatialize the identified digital asset.

Block 510 states spatialize the digital asset in response to the command.

One or more electronic devices execute code to process and to spatialize the digital asset.

Block 520 states save and/or play the spatialized digital asset.

The electronic device saves the spatialized digital asset to memory or to a storage location and plays and/or displays the spatialized digital asset to the user.

For example, a user issues a verbal command, gesture command, or eye command to an electronic device that instructs the electronic device or another electronic device to spatialize the digital asset. For instance, a camera of wearable electronic device (WED) worn on a head of the user captures a video, and a microphone of the WED receives a voice command from the user to spatialize the video. As another example, the user interacts with a user interface of an electronic device to issue the command to spatialize the digital asset. For instance, a user captures audio and/or video with electronic or AR glasses and interacts with the user interface on the display of the smartphone to spatialize the audio and/or video. The smartphone transmits the audio and/or video to a server that executes code to process and to spatialize the audio and/or video.

One way to spatialize a digital asset is to alter mono or stereo sound of the digital asset to be spatial audio, 3D audio, virtual sound, or binaural sound. One or more processors, such as a digital signal processor (DSP), processes or converts the sound into spatial audio. This process includes manipulating audio signals so the audio mimics or replicates acoustic behavior of sound in the real world.

As one example, ambisonic technology renders 3D sound fields around a head of the listener by decoding sound to a binaural stereo output. Ambisonics includes multiple orders of various channels (e.g., third order with sixteen channels of audio). When the listener moves his or her head, the decoded output (binaural sound) changes and continues to externally localize for the spatial effect. By way of example, FB 360 Spatial Workstation provides an end-to-end pipeline (including an encoder) that receives an audio file and renders the file to an ambisonic file that plays as spatial audio.

Consider an example that directs sound (e.g., 5.1 or 7.1 surround sound) to an audio filter that places the sound into a 3D sphere around the head of the listener. Electronics (e.g., accelerometers and/or gyroscopes) track movement of the head of the listener and/or electronic device with the listener (e.g., a smartphone or WED worn on the head of the listener).

Consider an example in which one or more processors or processing units convolve or process sound to provide this sound as 3D sound or binaural sound. For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

For example, a DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound. Other technologies exist as well to provide 3D sound to listeners.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes, but is not limited to, one or more of HRTFs, HRIRs, BRTFs, BRIRs, ILDs, ITDs, and/or other information that spatializes sound. By way of example, SLI are retrieved, obtained, or received from memory, a database, a file, an electronic device (such as a server, cloud-based storage, the blockchain, one or more smart contracts, or another electronic device in the computer or P2P system or in communication with a PED providing the sound to the user through one or more networks), etc. Instead of being retrieved from memory, this information can also be calculated in real-time and/or processed in real-time to provide spatial audio to the listener or user.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates $(r, \theta, \phi)$ for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information can be calculated or extracted from the HRTF data files. A unique set of HRTF information (including $r, \theta, \phi$) is determined for each unique HRTF. These coordinates provide the location of the SLP and hence can be used to track the SLP and know its location.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively, or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization.

Consider an example in which the ITD is calculated for a location $(\theta, \phi)$ with discrete Fourier transforms (DFTs) calculated for the left and right ears. The ITD is located at the point for which the function attains its maximum value, known as the argument of the maximum or arg max as follows:

$$ITD = \arg\ \max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at $(r, \theta, \phi)$. Such sounds include filtering stereo and monaural sound to localize at $(r, \theta, \phi)$. For example, given an input signal as a monaural sound signal $s(n)$, this sound is convolved to appear at $(\theta, \phi)$ when the left ear is presented with:

$$s_l(n) = s(n-ITD) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal $x(t)$ is convolved with a linear filter of an impulse response $h(t)$ to generate an output signal $y(t)$ as follows:

$$y(\tau) = x(\tau) \cdot h(\tau) = \int_0^\infty x(\tau-t) \cdot h(t) \cdot dt.$$

This reduces to a summation when the impulse response has a given length N and the input signal and the impulse response are sampled at $t = iDt$ as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge. One or more example embodiments expedite playing of sound to a user by prefetching, decrypting, and/or caching the sound before the sound is played to the listener in accordance with an example embodiment.

For example, an electronic device receives or obtains the sound from local memory (e.g., memory on the electronic device), local storage (e.g., memory directly attached to the electronic device), remote storage (e.g., memory accessed over the Ethernet or wireless network), a server, a database, a data center, etc.

When sound is already convolved into binaural sound, this sound can be converted back into mono or stereo sound or played as mono or stereo sound. For example, the electronic device plays the sound through a single speaker.

As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

Another way to spatialize a digital asset is to convert or change the digital asset into a 3D image, AR image, or a VR image. For example, an example embodiment executes software from a cloud-converter or AR platform to convert a 2D image, such as a JPEG or PNG image, into an AR file, such as a WebAR file.

An example embodiment spatializes the digital asset with little or no interaction from the user. For example, in response to an electronic device being commanded to spatialize a digital asset, the electronic device automatically initiates and executes blocks 510 and 520.

Figure 6:
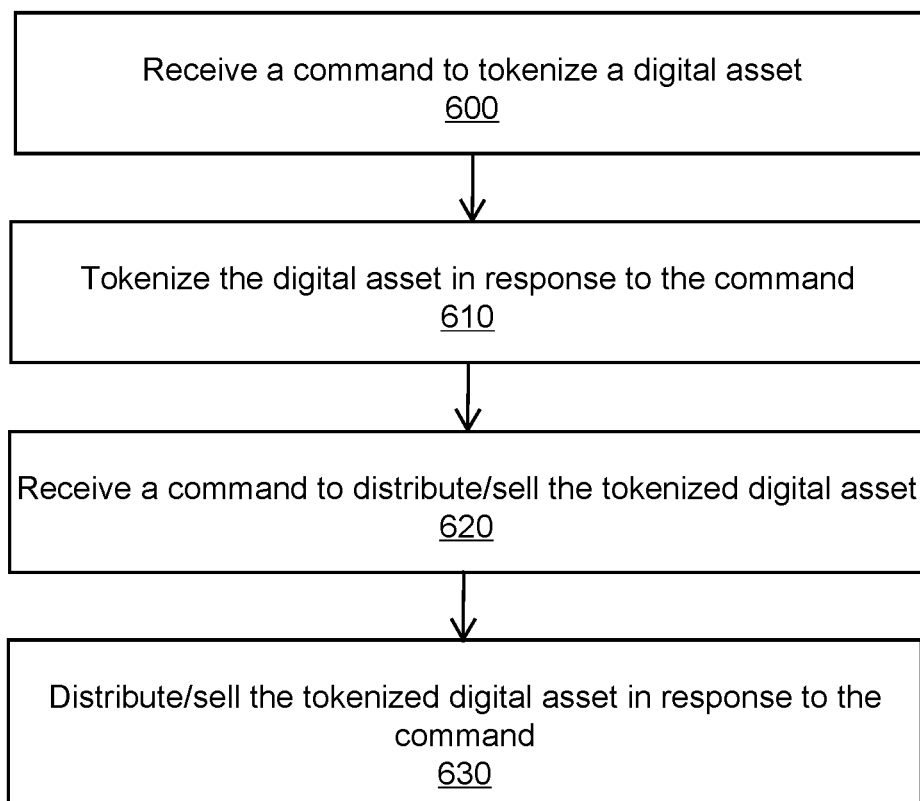
FIG. 6 is a flow diagram of an automated process that tokenizes a digital asset and distributes and/or sells the tokenized digital asset at an electronic marketplace in accordance with an example embodiment.

FIG. 6 is a flow diagram of an automated process that tokenizes a digital asset and distributes and/or sells the tokenized digital asset at an electronic marketplace in accordance with an example embodiment.

Block 600 states receive a command to tokenize a digital asset.

An electronic device receives a command to tokenize a digital asset. Examples of the command include, but are not limited to, a spoken or verbal command from the user, a gesture command from the user, an eye command, a command from a portable electronic device (PED), a command from a handheld portable electronic device (HPED), or a command or instruct from a user interface of the electronic device. For example, the electronic device receives the command from another electronic device, such as from a server, a wearable electronic device with the user, a portable electronic device (such as a smartphone in a hand of the user), a controller in a hand of the user, a smartwatch, or another electronic device.

Consider an example in which a user clicks on or otherwise activates a single button, icon, menu selection, or graphical representation that instructs the electronic device to initiate steps to tokenize a selected digital asset. As another example, the user selects or identifies a digital asset and issues a single voice command (e.g., "tokenize"), and this command instructs one or more electronic devices to execute a sequence of steps to tokenize the identified digital asset.

Block 610 states tokenize the digital asset in response to the command.

Tokenizing a digital asset includes transforming the data of the digital asset into a random or meaningless string or sequence of characters called a token. The original data cannot be derived or guessed from the token because, unlike encryption, tokenization does not utilize a key, algorithm, or mathematical process to transform the data into an encrypted format. Instead, the token is a reference to the original data, as opposed to being an encrypted or mathematical version of the original data. A database or token vault stores a relationship between the data and the token, while the real or original data in the token vault is secured and encrypted. If the original data is subsequently desired, the token is submitted to the vault which fetches the original data.

Non-Fungible Tokens (NFTs) are one type of cryptographic tokens on a blockchain that represent a unique digital asset. NFTs include unique information and are non-fungible or not mutually interchangeable. Although multiple NFTs can be minted or produced to represent a same object, NFTs differ from each other since they contain unique identification codes and metadata. NFTs differ from fungible tokens, such as cryptocurrencies that are identical to each other.

NFTs are based on a blockchain, which is a digital ledger of transactions duplicated and distributed across a network of computers. Each block in the blockchain includes a record of transactions. Specifically, each block includes a cryptographic hash of the previous block, a timestamp, and transaction data. Each time a new transaction occurs on the blockchain, the record for this transaction is added to the ledger. As such, a blockchain is a decentralized, distributed digital ledger in which records or blocks record transactions across many computers. A single block in the chain cannot be altered retroactively without altering all subsequent blocks since each block includes a hash of the previous block.

A blockchain can be managed with a peer-to-peer (P2P) network as a distributed ledger. Peers in this network follow a predetermined protocol for inter-node communication in order to validate the addition of a new block to the blockchain. Each node in the network includes a copy of the blockchain with no single copy being an official or trusted copy over another copy. Transactions broadcast to the nodes in the network with timestamps. The P2P network has no central point of failure and hence lacks a single point of attack from a hacker.

Blockchains provide security against corruption, hacking, or loss of data. The data in any given block cannot be altered without altering all the blocks. In order for a hacker to corrupt a blockchain, the hacker would have to alter each block in many copies of the chain that are distributed across the blockchain network. If the hacker merely changed one or two blocks, this change would be readily apparent as the changed blocks would not correspond to multiple other copies of the block distributed across the network.

The electronic device, user, or software selects a blockchain on which to issue the token for a digital asset. One or more electronic devices execute code to process and to tokenize the digital asset. The token can issue on one of various blockchains, such as Ethereum, Binance Smart Chain, Flow, Tron, Cosmos, EOS, Pokadot, Tezos, et al.

An example embodiment creates a fungible or non-fungible token that is compatible with an existing blockchain network. Consider an example embodiment that creates and releases the tokens on the Ethereum blockchain or uses ERC-20 Ethereum or the ERC-20 standard. Tokens created with ERC-20 have a compatible framework that makes them interoperable with each other and compatible with a common wallet.

Block 620 states receive a command to distribute and/or sell the tokenized digital asset.

An electronic device receives a command to distribute and/or to sell the tokenized digital asset from one or more of the user, another electronic device, a user interface, software, or a software application. Examples of the command include, but are not limited to, a spoken or verbal command from the user, a gesture command from the user, or a command or instruct from a user interface of the electronic device. The electronic device can also receive the command from another electronic device, such as from a server, a wearable electronic device with the user, a portable electronic device (such as a smartphone in a hand of the user), or another electronic device.

Block 630 states distribute and/or sell the tokenized digital asset in response to the command.

In an example embodiment, an electronic device, software application, user agent, intelligent personal assistant, or user selects a digital wallet for the token. Digital wallets or electronic wallets (e-wallets) provide various services that enable a user to store and to manage the tokens or cryptocurrencies. For example, the wallet provides a platform for transferring tokens and cryptocurrencies and converting them into different currencies, such as converting bitcoin or ether into US dollars.

An example embodiment tokenizes the digital asset, establishes a digital wallet, and sets up a wallet account for the user with little or no interaction from the user. For example, in response to an electronic device being commanded to tokenize a digital asset, the electronic device automatically initiates and executes blocks 610, 620, and 630.

For instance, the electronic device of the user transmits an email address and password to a wallet service, such as Blockchain wallet, Ethereum wallet, MetaMask, et al. If the wallet service requests or requires verification information, the electronic device transmits this information on behalf of the user to the wallet service. Once the wallet account is confirmed or established, the electronic device stores the user's wallet identification and website of the digital wallet. Further, if a mobile application is available for accessing the digital wallet, the electronic device downloads and installs this application for the user. For instance, a software application or user agent performs these tasks on behalf of the user.

In an example embodiment, an electronic device, software application, or user agent selects an electronic marketplace to offer and/or to sell the token.

Electronic marketplaces provide online platforms where users can buy, sell, and trade digital or cryptographic assets on a blockchain, such as tokens.

Transactions on a blockchain execute through a smart contract. A smart contract is a type of self-executing contract in which the terms and conditions of the transaction or agreement between the buyer and seller are written into lines of code. The code and accompanying agreement are decentralized and distributed in the blockchain network.

An example embodiment selects an electronic marketplace and transmits the tokens and related information to list the tokens for sale at the electronic marketplace. For example, the electronic device of the user selects an electronic marketplace (e.g., OpenSea or another e-marketplace) and transmits information to open an account and/or user profile on behalf of the user. For instance, the electronic device links information of the digital wallet to the electronic marketplace to setup and establish an account for the user.

Figure 7:
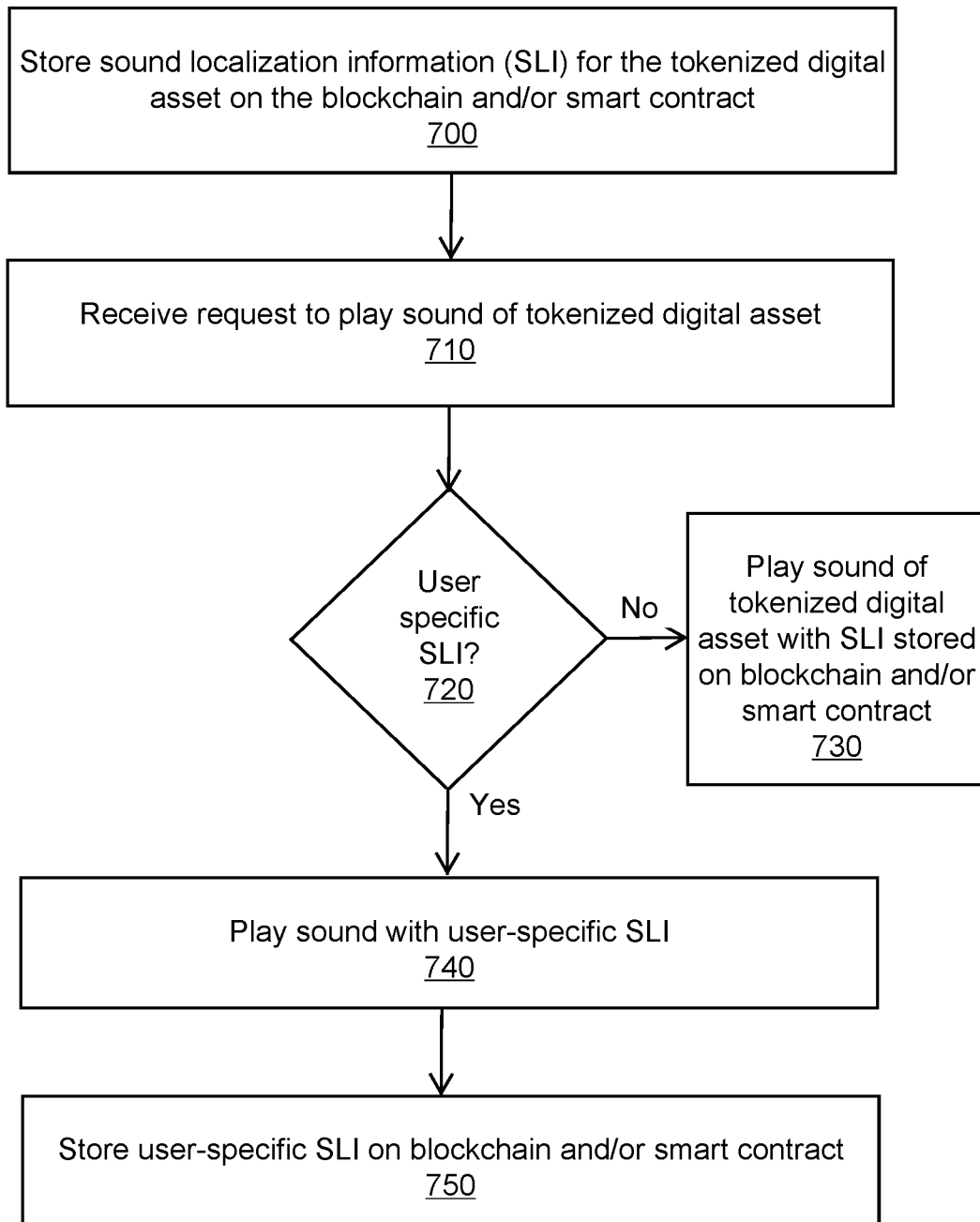
FIG. 7 is a method to play spatial audio with sound localization information (SLI) stored on the blockchain and/or smart contracts in accordance with an example embodiment.

FIG. 7 is a method to play spatial audio with sound localization information (SLI) stored on the blockchain and/or smart contracts in accordance with an example embodiment.

Block 700 states store sound localization information (SLI) for the tokenized digital asset on the blockchain and/or one or more smart contracts.

In an example embodiment, the SLI includes generic HRTFs, customized HRTFs, interaural time delays (ITDs), interaural level differences (ITDs), and other information to generate spatial audio. The SLI can also include physical attributes of an owner, such as shape and/or size of head, eye distance, shape of ear, etc.

Customized HRTFs or HRTFs that are customized to the listener are specific to an anatomy of a particular listener and are based on a size and/or shape of one or more physical attributes, such head size, ear shape, eye distance, distance between ears, etc. Customized HRTFs can be obtained from actual measurements of a listener or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge.

Block 710 states receive a request to play sound of the tokenized digital asset.

For example, an electronic device receives a request to play or to view a tokenized digital asset that includes sound. The request can be from one or more of an electronic device, a user, a sensor, software, an application, a user agent, or hardware. For instance, a user navigates to an electronic marketplace to view a tokenized digital asset and initiates a request to play and/or to hear sound of the digital asset. As another example, a user interacts with an electronic device or user interface and requests to play, to view, and/or to hear sound of a tokenized digital asset. As another example, a sensor detects activity of a user, and this activity initiates playing of the sound. As another example, a user plays an AR or VR game and takes an action during gameplay that causes the game and/or software executing the game to request the sound to play. As another example, a user watches a sporting event, and a server receives a request to play tokenized spatial audio to the user watching the sporting event.

Block 720 makes a determination as to whether user-specific or customized sound localization information (SLI) exists.

If the answer to this determination is "no" then flow proceeds to block 730 that states play sound of the tokenized digital asset with SLI stored on the blockchain and/or smart contract.

If the answer to this determination is "yes" then flow proceeds to block 740 that states play sound with user-specific SLI.

Block 750 states store the user-specific SLI on the blockchain and/or smart contract.

Consider an example embodiment in which a tokenized digital asset includes sound that plays as spatial audio, 3D audio, or binaural sound. This spatial audio plays to a listener with generic HRTFs or customized HRTFs. These examples include processing the sound with generic HRTFs and storing this sound, processing the sound with customized HRTFs and storing this sound, storing the generic HRTFs and processing the sound with the generic HRTFs in real-time (e.g., when a request is made to hear the sound), and/or storing the customized HRTFs and processing the sound with the customized HRTFs in real-time (e.g., when a request is made to hear the sound). An example embodiment stores the processed sound on the blockchain, in the smart contract, and/or with the digital asset.

As a first example, Bob (user 1) activates a graphical representation or takes another action that requests sound of a tokenized digital asset to play. Customized HRTFs are not known or stored for Bob. As such, sound of the tokenized digital asset plays to Bob as spatial audio convolved or processed with generic HRTFs.

As a second example, Ted (user 2) activates the graphical representation or takes another action that requests the sound of the tokenized digital asset to play. Customized HRTFs are known for Ted (e.g., stored on the blockchain, smart contract, local memory of his electronic device, etc.). As such, sound of the tokenized digital asset plays to Ted as spatial audio convolved or processed with customized HRTFs. This sound (processed with the customized HRTFs for Ted) may be previously stored and ready to play upon receiving the request or processed in real-time in response to receiving the request.

If the sound is processed in real-time with the customized HRTFs, the processed sound can be stored on the blockchain, with smart contract, in local memory, with the digital asset, etc. For example, after processing the sound with the customized HRTFs, an example embodiment thereafter stores the processed sound and/or customized HRTFs. This process expedites playing of the sound upon receiving a subsequent request. This process also updates the record, such as updating transaction history or ownership information on the blockchain to include customized HRTFs or customized spatial audio for Ted.

The blockchain includes a chain or sequence of blocks in a particular order. Each block includes a data structure that stores a set of transactions or records distributed to other nodes or peers in the blockchain network. In particular, each block includes a cryptographic hash of the previous block, a timestamp, and transaction data. The transaction data can include one or more of the following: names and/or identifying information of owners of the digital asset, names and/or identifying information of restricted owners of the digital asset, restrictions and/or permissions to the digital asset, SLI (such as HRTFs for an owner), and other information discussed herein. The transaction data can also include information concerning the sale or transfer of the digital asset.

Figure 8A:
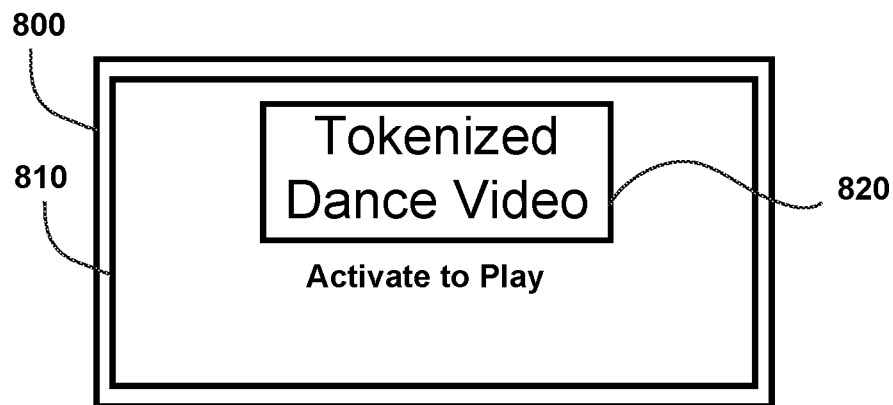
FIG. 8A shows an electronic device with a display that displays a tokenized digital asset in accordance with an example embodiment.

FIG. 8A shows an electronic device 800 with a display 810 that displays a tokenized digital asset 820 (shown for example as a dance video) in accordance with an example embodiment.

The display 810 notifies the user to activate the tokenized digital asset 820 in order to play the video. For example, the user interacts with the display or user interface to activate and to play the video or issues a voice command, a gesture command, a gaze or eye command, or another command to activate and to play the video.

Figure 8B:
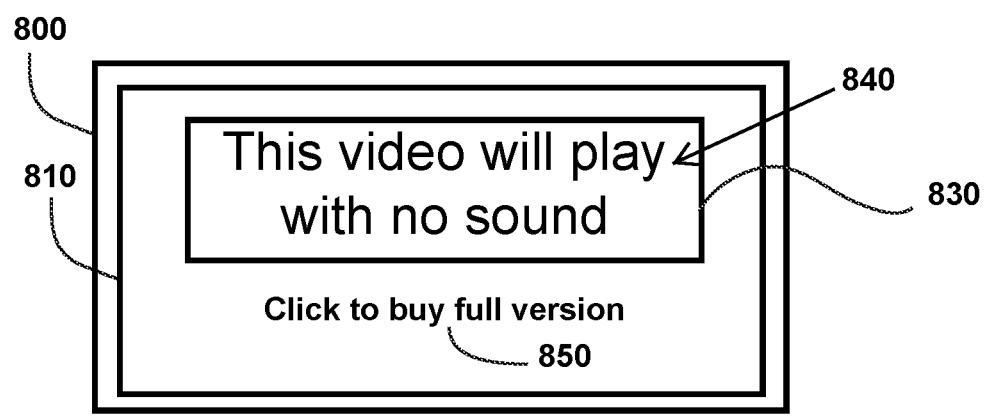
FIG. 8B shows an electronic device with a display that displays a message stating a tokenized digital asset includes a restriction in accordance with an example embodiment.

FIG. 8B shows an electronic device 800 with a display 810 that displays a message 830 stating a tokenized digital asset includes a restriction 840 in accordance with an example embodiment.

The display 810 includes information (such as an alert, a notice, text, graphics, etc.) that inform and/or notify the user of the restriction. This information can describe how the restriction applies to the digital asset (e.g., how the sound, image, video, game, application, etc. is being restricted and what is the restriction).

By way of example, the restriction 840 executes such that the video will play with no sound. If the user desires to play the video with sound and hence no restriction, then the user can buy the tokenized digital asset. The display includes a link 850 (click to buy full version) that when activated will automatically navigate the user to a website (e.g., an electronic marketplace) where the user can purchase the tokenized digital asset and view the video without the restriction.

Figure 9A:
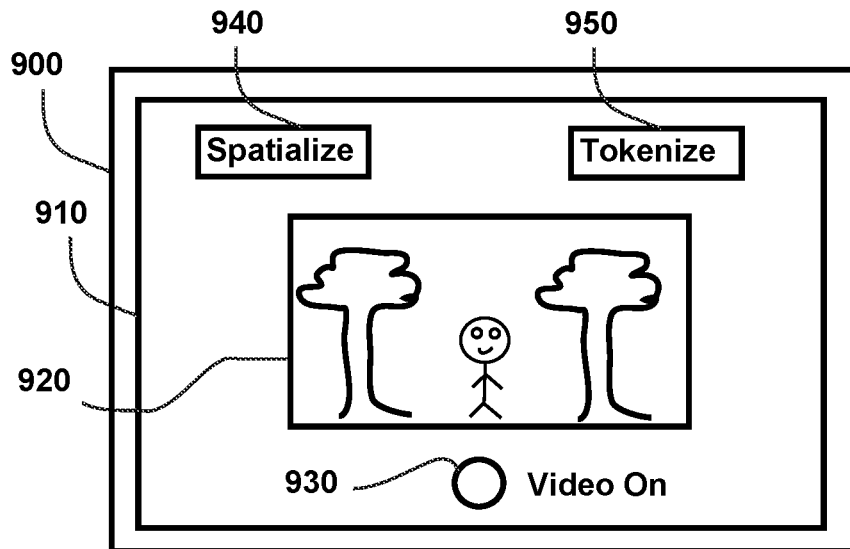
FIG. 9A shows an electronic device with a display displaying a digital asset being captured with a camera and options to spatialize and/or tokenize the digital asset in accordance with an example embodiment.

FIG. 9A shows an electronic device 900 with a display 910 displaying a digital asset 920 being captured with a camera 930 and options to spatialize 940 and/or tokenize 950 the digital asset in accordance with an example embodiment.

The display 910 shows a digital asset 920 being captured with the camera 950. In this example, the digital asset is a video captured with the camera. If the user desires to spatialize and/or tokenize the video, he or she can issue a command to the electronic device to do so. For example, the user activates the option spatialize 940 to spatialize the video and/or activates the option tokenize 950 to tokenize the video. These options include an icon, a button, a sticker, a VR image, an AR image, a hologram, a virtual image, a hyperlink or link, text, or a graphical representation. Further, the user can issue other types of commands as discussed herein.

Figure 9B:
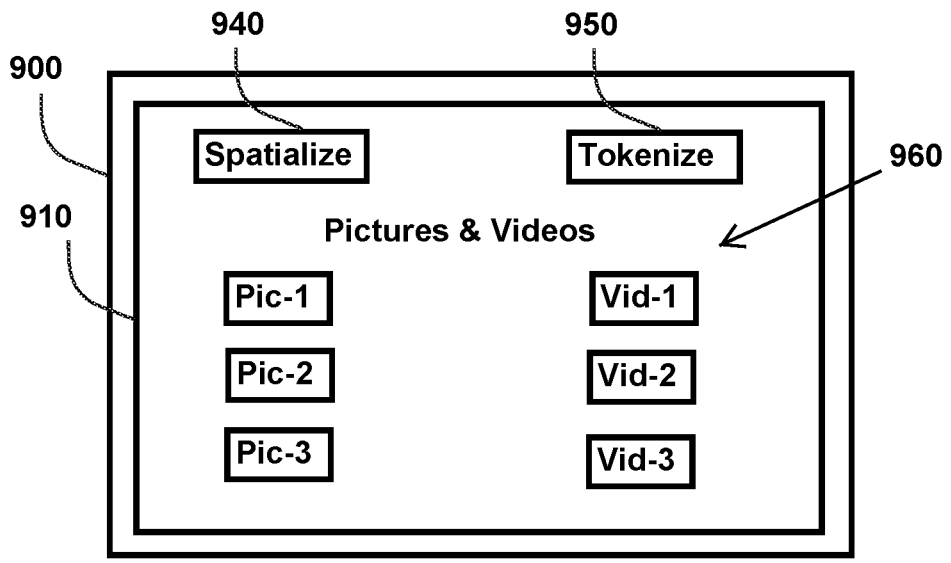
FIG. 9B shows an electronic device with a display displaying pictures and videos and options to spatialize and/or tokenize the pictures and/or videos in accordance with an example embodiment.

FIG. 9B shows an electronic device 900 with a display 910 displaying pictures and videos 960 and options to spatialize 940 and/or tokenize 950 the pictures and/or videos in accordance with an example embodiment.

For example, the user takes pictures (shown as Pic-1, Pic-2, and Pic-3) and videos (shown as Vid-1, Vid-2, and Vid-3). The display 910 displays these pictures and videos 960. If the user desires to spatialize and/or tokenize one or more of these pictures and videos 960, he or she can issue a command to the electronic device to do so. For example, the user selects a picture or video and activates the option spatialize 940 to spatialize the selected picture or video and/or activates the option tokenize 950 to tokenize the selected picture or video.

FIGS. 9A and 9B show a user interface that enables the user to readily identify or select a digital asset and then issue a single command to spatialize and/or to tokenize the selected digital asset.

Figures 10, 11:
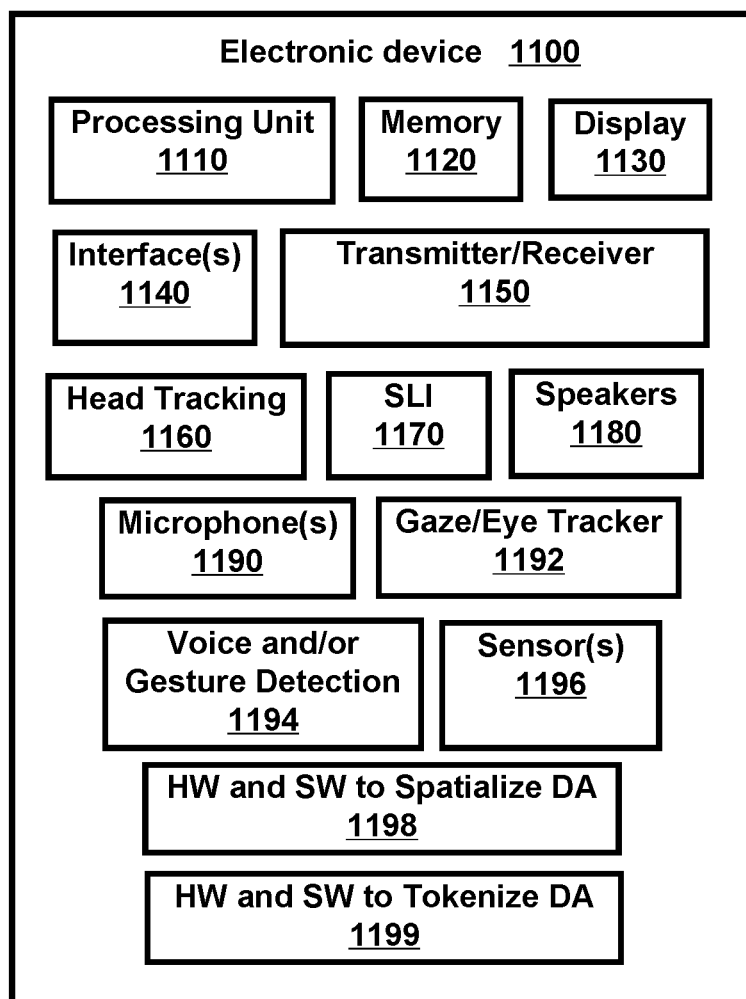
FIG. 10 shows information in one or more layers of a blockchain in accordance with an example embodiment.
FIG. 11 is an electronic device in accordance with an example embodiment.

FIG. 10 shows information in one or more layers of a blockchain 1000 in accordance with an example embodiment.

An example architecture of the blockchain includes six layers: data layer (data blocks, hash function, chain structure, Merkle Tree, and timestamp), network layer (P2P network, transmission mechanism, and authentication mechanism), consensus (Proof of Work, Proof of Stake, et al.) layer, incentive layer (release and allocation mechanisms), contract layer (script code, contract, et al.), and application layer (blockchain-based applications).

Blockchain 1000 includes one or more of the following information in the layers: owner information 1020, SLI 1030, restrictions 1040, code to spatialize 1050, and code to tokenize 1060. The owner information 1020 includes information about an owner of the digital asset and/or token. The SLI 1030 includes sound localization information (such as HRTFs) to generate spatial audio for sound of the digital asset. As discussed herein, the HRTFs include generic HRTFs and user-specific or customized HRTFs for a user (including an owner). The restrictions 1040 include the one or more restrictions associated with the digital asset, such as the restrictions discussed herein. The code to spatialize 1050 includes code to spatialize the digital asset, such as methods to spatialize discussed herein with executable code. The code to tokenize 1060 includes code to tokenize the digital asset, such as methods to tokenize discussed herein with executable code.

The information shown in FIG. 10 can be included in a smart contract associated with the blockchain. Consider an example embodiment in which code to execute one or more blocks in FIGS. 1 and 4-7 occurs in the contract layer of the blockchain.

A smart contract is a program written on top of the blockchain and includes code that automatically executes by nodes in the blockchain network to enforce the terms of the digital asset. The smart contract includes programmatically-executed transactions (PETs) or computer scripts that execute when triggered by a particular message. Each node in the blockchain network verifies the terms of the smart contract. When the terms or rules of the smart contract are satisfied, the agreement executes or is enforced per the terms. For example, code of the smart contract executes one or more blocks in FIGS. 1 and 4-7.

Consider an example in which the data layer includes operations components and journal components. The operations components govern how data is created in new records, how records are modified, execution code, and smart contracts. The journal components include the stored records.

FIG. 11 is an electronic device 1100 in accordance with an example embodiment.

The electronic device 1100 includes a processor or processing unit 1110, memory 1120, a display 1130, one or more interfaces 1140, a wireless transmitter/receiver 1150, head tracking 1160 (such as one or more of an inertial sensor, accelerometer, gyroscope, and magnetometer), sound localization information (SLI) 1170, speakers 1180, one or more microphones 1190, gaze and/or eye tracker 1192, voice and/or gesture detection 1194 (including a microphone and/or camera), one or more sensors 1196 (such as one or more of a proximity sensor, infrared sensor, and camera), hardware (HW) and software (SW) to spatialize a digital asset (DA) 1198 (such as one or more processors and executable code to spatialize a digital asset as discussed herein), and hardware (HW) and software (SW) to tokenize a digital asset (DA) 1199 (such as one or more processors and executable code to tokenize a digital asset as discussed herein).

Memory 1120 includes computer readable medium (CRM) that stores code and/or instructions to execute one or more example embodiments. The memory also stores the blockchain and/or smart contracts.

Examples of an interface 1140 include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

The processor or processing unit 1110 includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving or spatialization process with the retrieved HRTFs or HRIRs (or other transfer functions or impulse responses) to process sound so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves, processes, and/or spatializes the sound captured at the microphones of an electronic device and provides this spatialized sound to an electronic marketplace for tokenization and/or to the listener so the listener can localize the sound and hear it. The listener or other users hearing the sound can experience a resulting localization externally (such as at a sound localization point (SLP) associated with near field HRTFs and far field HRTFs) or internally (such as monaural sound or stereo sound).

The memory 1120 stores sound localization information that includes one or more of HRTFs, HRIRs, BRTFs, BRIRs, RTFs, RIRs, or other transfer functions and/or impulse responses for spatializing, processing, and/or convolving sound. The memory can also store instructions for executing one or more example embodiments. Further, the memory can store the sound, graphical representations, and other information and instructions discussed herein (e.g., tokenizing the digital asset). The memory can also store coordinate locations and head movements used to determine the location of the binaural sound and the location for the visual indication of this sound on the display (e.g., a virtual image that appears at a source of the binaural sound or spatial audio).

The electronic device 1100 provides sound to the users through one or more speakers 1180. Alternatively, or in addition to the speakers, the electronic device can communicate with headphones, earphones, earbuds, bone conduction devices, or another electronic device that provides sound to the user.

The components shown in the electronic device 1100 can exist in a single electronic device or multiple electronic devices, such as some components being in a WED or head mounted display (HMD) that wirelessly communicates with a smartphone and/or server.

Figure 12:
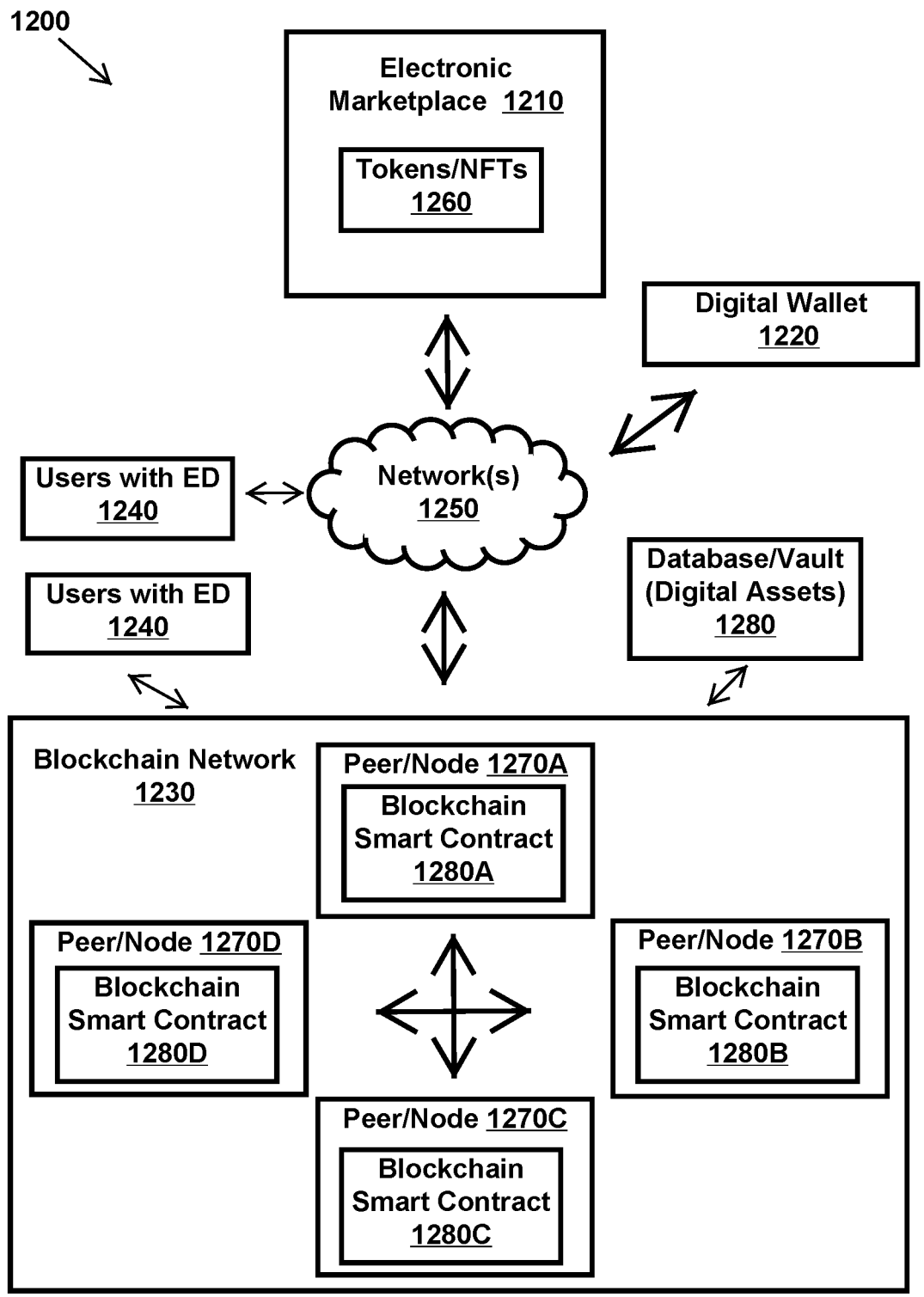
FIG. 12 is an electronic or computer system in accordance with an example embodiment.

FIG. 12 is an electronic or computer system 1200 in accordance with an example embodiment.

The computer system 1200 includes an electronic marketplace 1210, a digital wallet 1220, a blockchain network 1230, and users with electronic devices (ED) 1240 connected to or in communication with one or more networks 1250.

The electronic marketplace 1210 offers for sale, trade, or distribution digital assets in the form of tokens and/or NFTs 1260. The electronic marketplace is an online marketplace or e-commerce website where products and services are sold, such as tokens, NFTs, cryptocurrencies, and digital assets.

The digital wallet 1220 (also known as an e-wallet or electronic wallet) is an online service and/or software program that enables users to make electronic transactions with each other. Goods and services are bought and sold with one or more digital currencies or cryptocurrencies, such as Bitcoin or Ether.

The blockchain network 1230 includes a plurality of peers, nodes, or electronic devices 1270A-1270D with each peer having a blockchain and/or smart contract 1280A-1280D. The blockchain network 1230 includes and/or is in communication with a database or token vault 1280 that stores digital assets, such as digital assets, tokens, and NFTs on the blockchain.

The blockchain network 1230 can include one or more blockchain networks, such as a private blockchain network, a public blockchain network, and a consortium blockchain network.

The networks include one or more of a cellular network, a public switch telephone network, the Internet, a local area network (LAN), a wide area network (WAN), a metropolitan area network (MAN), a personal area network (PAN), home area network (HAM), blockchain network(s), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device (ED) include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, and/or a DSP.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for spatializing sound, tokenizing a digital asset, and executing one or more example embodiments (e.g., placing, executing, and managing restrictions on tokens).

Consider an example in which a customized or dedicated DSP executes one or more blocks discussed herein (including processes, spatializes, and/or convolves sound into binaural sound. Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method comprising:
receiving, at an electronic device and from a user, a restriction that restricts how sound of a digital asset plays to non-owners of the digital asset that is tokenized as a non-fungible token (NFT);
tokenizing, with one or more electronic devices, the digital asset as the NFT on a blockchain that stores the restriction how the sound of the digital asset plays to the non-owners of the NFT; and
executing the restriction on the blockchain to play the sound of the digital asset as one of mono sound or stereo sound to the non-owners of the NFT but playing the sound of the digital asset as binaural sound to owners of the NFT.

2. The method of claim 1 further comprising:
executing the restriction on the blockchain to play video of the digital asset with two-dimensional (2D) images to the non-owners of the NFT while prohibiting the video of the digital asset from playing with three-dimensional (3D) images to the non-owners of the NFT.

3. The method of claim 1 further comprising:
executing the restriction on the blockchain to play the sound of the digital asset processed with head-related transfer functions (HRTFs) in response to determining a person is the owner of the NFT.

4. The method of claim 1 further comprising:
receiving, at the electronic device and from the user, a single click on a graphical representation; and
spatializing the sound of the digital asset into the binaural sound in response to receiving the single click on the graphical representation.

5. The method of claim 1 further comprising:
receiving, at the electronic device and from the user, a single click on a graphical representation; and
tokenizing the digital asset into the NFT on the blockchain in response to receiving the single click on the graphical representation.

6. The method of claim 1 further comprising:
tokenizing, with the one or more electronic devices, the digital asset as the NFT on the blockchain that stores a restriction that prohibits playing of a video of the digital asset to the non-owners of the NFT as an augmented reality (AR) image or a virtual reality (VR) image.

7. The method of claim 1 further comprising:
tokenizing, with the one or more electronic devices, the digital asset as the NFT on the blockchain that stores a restriction that restricts the non-owners of the NFT from viewing the NFT as an augmented reality (AR) image or a virtual reality (VR) image.

8. A method comprising:
tokenizing, with one or more electronic devices, a video with sound as a non-fungible token (NFT) on a blockchain that stores a restriction that prevents non-owners of the NFT from hearing the sound of the video as binaural sound but allows the sound to play as the binaural sound to owners of the NFT.

9. The method of claim 8, wherein the restriction allows the binaural sound processed with head-related transfer functions (HRTFs) to play to the owners of the NFT.

10. The method of claim 8, wherein the restriction prohibits playing of images in the video to the non-owners of the NFT as augmented reality (AR) images or virtual reality (VR) images.

11. The method of claim 8 further comprising:
playing, in response to executing the restriction, the video to the owners of the NFT with augmented reality (AR) images or virtual reality (VR) images; and
prohibiting, in response to executing the restriction, playing of the video with the AR images or the VR images to the non-owners of the NFT.

12. The method of claim 8 further comprising:
receiving, at an electronic device and from one of the non-owners of the NFT, a request to play the video with the sound; and
displaying, with the electronic device, a notice that describes the restriction that prevents the one of the non-owners of the NFT from hearing the sound of the video.

13. The method of claim 8 further comprising:
storing, in the blockchain, head-related transfer functions (HRTFs) that are processed with the sound in the video to provide the sound as the binaural sound played to the owners of the NFT.

14. The method of claim 8 further comprising:
storing, in a smart contract of the blockchain, the restriction as executable code that prevents the non-owners of the NFT from hearing the sound of the video as the binaural sound and viewing the video as augmented reality (AR) or virtual reality (VR).

15. An electronic device comprising:
a user interface that receives, from a user, a restriction that restricts how sound of a tokenized digital asset plays to non-owners of the tokenized digital asset; and
a processor that executes code to tokenize the digital asset as a non-fungible token (NFT) on a blockchain that stores the restriction how the sound of the tokenized digital asset plays to the non-owners of the NFT,
wherein the user interface receives a single click from the user, and the processor executes the code to spatialize the sound of the tokenized digital asset into binaural sound in response to the user interface receiving the single click from the user.

16. The electronic device of claim 15 further comprising:
a display that displays a notice of the restriction in response to one of the non-owners requesting to play the tokenized digital asset.

17. The electronic device of claim 15, wherein the processor executes the code to store head-related transfer functions (HRTFs) on the blockchain, wherein the HRTFs are processed with the sound of the tokenized digital asset to generate the binaural sound played to owners of the NFT but not to the non-owners of the NFT.

18. The electronic device of claim 15, wherein the processor executes the code to tokenize the digital asset as the NFT on the blockchain that stores a restriction that executes to play images as augmented reality (AR) images or virtual reality (VR) images to owners of the NFT but prohibits playing of the images as the AR images or the VR images to the non-owners of the NFT.

* * * * *